United States Patent
Park et al.

(10) Patent No.: US 6,408,186 B1
(45) Date of Patent: Jun. 18, 2002

(54) METHOD OF LOCATING A MOBILE PHONE BY MEASURING THE DISTANCE BETWEEN THE PHONE AND A BASE STATION IN A CELLULAR MOBILE TELEPHONE SYSTEM

(75) Inventors: Jee-Yeon Park; Pyeong-Hwan Wee, both of Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/488,808

(22) Filed: Jan. 21, 2000

(30) Foreign Application Priority Data

Jan. 23, 1999 (KR) .............................................. 99-2064

(51) Int. Cl.$^7$ ................................................ H04Q 7/20

(52) U.S. Cl. ................. 455/456; 455/67.1; 342/357.02; 342/357.08; 701/214; 701/215

(58) Field of Search ................................ 455/423, 424, 455/67.1, 67.6, 456; 342/357.02, 357.08; 701/214

(56) References Cited

U.S. PATENT DOCUMENTS

| | | | | |
|---|---|---|---|---|
| 6,026,301 A | * | 2/2000 | Satarasinghe | 455/436 |
| 6,108,558 A | * | 8/2000 | Vanderspool, II | 455/456 |
| 6,289,280 B1 | * | 9/2001 | Fernandez-Corbaton et al. | 701/214 |
| 6,327,534 B1 | * | 12/2001 | Levanon et al. | 701/215 |

* cited by examiner

*Primary Examiner*—Daniel Hunter
*Assistant Examiner*—Tuan Tran
(74) *Attorney, Agent, or Firm*—Klauber & Jackson

(57) ABSTRACT

A method of measuring the distance between a mobile phone and a base station based on the round-trip delay (RTD) of a prescribed message transmitted from the base station to the mobile phone in a cellular mobile telephone system (CMTS), comprising the steps of calculating a mean error distance to adjust the distance between the base station and the mobile phone within the cell boundary of the base station, measuring the RTD between the base station and the mobile phone positioned at an arbitrary point within the cell, calculating the RTD distance between the base station and the mobile phone based on the RTD measurement by subtracting the mean error distance from the RTD distance.

13 Claims, 19 Drawing Sheets

METHOD OF LOCATING A MOBILE PHONE BY MEASURING THE DISTANCE BETWEEN THE PHONE AND A BASE STATION IN A CELLULAR MOBILE TELEPHONE SYSTEM

CLAIM OF PRIORITY

This application makes reference to, incorporates the same herein, and claims all benefits accruing under 35 U.S.C. Section 119 from an application for METHOD OF LOCATING A MOBILE PHONE BY MEASURING THE DISTANCE BETWEEN THE PHONE AND A BASE STATION IN A CELLULAR MOBILE TELEPHONE SYSTEM filed earlier in the Korean Industrial Property Office on the 23th day of January 1999 and there duly assigned Ser. No. 2064/1999.

BACKGROUND OF THE INVENTION

1. Field of the Invention

The present invention relates to a cellular mobile telephone system (CMTS), and more particularly a method for providing more accurate measurement of the distance between a mobile phone and a base station by incorporating a round-trip delay (RTD) and the mean error distance therebetween.

2. Description of the Related Art

A geographic area served by the CMTS is divided into a group of smaller areas known as cells. Each cell includes a base station to provide communication with a mobile phone or a portable instrument within the boundary of a cell. In addition, all the base stations are controlled by a mobile switching center (MSC) to enable communication between the cells.

Referring to FIG. 1, a network of the CMTS using the CDMA (Code Division Multiple Access) technology generally consists of a plurality of base stations 20, 30, 40 for providing communication with mobile phones 10 and an MSC 50 for connecting the mobile phones with a public switched telephone network (PSTN) 60. This type of CMTS is used to provide additional service to the mobile phone users 20, 30, 40, by locating their positions in relation to the surrounding base stations. To this end, various methods have been developed to measure the distance between the mobile phone and the base station.

One method uses the time of arrival (TOA) measurement. Namely, a mobile phone transmits a prescribed message signal to at least 3 adjacent base stations, thus determining the distance between the mobile phone and each respective base station using the transmission time of the message signal. Calculating a radial distance between the mobile phone and three base stations provides an accurate fix, as the intersection of the three spheres. However, in this case, the mobile phone should be provided with the means for transmitting the prescribed message to the base stations.

Another method uses a round trip delay (RTD) which uses a prescribed message transmitted from the base station to the mobile phone and measures the time it takes to complete a round-trip for the prescribed message to return back to the base station. However, in this case, radio waves of the message are subjected to various microwave obstructions, such as buildings, thus the RTD inherently includes a delay resulting from reflection by such obstructions. This type of delay degrades the accuracy of locating the exact position of a mobile phone.

SUMMARY OF THE INVENTION

It is an object of the present invention to provide a method of obtaining a reliable measurement of the distance between a mobile phone and a base station based on the RTD measurement adjusted by a GPS system.

It is another object of the present invention to provide a method of calculating the mean error distance to adjust the distance between the mobile phone and the base station obtained by the RTD measurement.

According to an aspect of the present invention, a method of measuring the mean error distance to adjust the distance between a mobile phone and a base station obtained by a round-trip delay (RTD) measurement of a prescribed message transmitted from the base station to the mobile phone in a cellular mobile telephone system (CMTS), the method comprises the steps of determining a plurality of measuring points within the cell boundary of the base station to be used for obtaining the mean error distance; measuring the respective RTDs between the measuring points and the base station by sequentially positioning the mobile phone at each of the measuring points; calculating the respective RTD distances between the measuring points and the base station based on the respective RTDs; obtaining the GPS (Global Positioning System) data of the base station and the measuring points; calculating the respective GPS distances between the base station and the measuring points based on the GPS data; and, calculating the respective error distances based on the difference between the respective RTD distances and the GPS distances for all measuring points and obtaining the mean error distance from these respective error distances.

According to another aspect of the present invention, a method of measuring the distance between a mobile phone and a base station in the CMTS, comprises the steps of calculating a mean error distance to adjust the distance between the mobile phone and the base station within the cell boundary of the base station; measuring the RTD between the base station and the mobile phone positioned at an arbitrary point within the cell; calculating a new and more accurate RTD distance between the mobile phone and the base station based on the RTD measurement by subtracting the mean error distance from the measured RTD distance.

The foregoing and other objects, features, and advantages of the invention will be apparent from the following more particular description of preferred embodiments as illustrated in the accompanying drawings.

A BRIEF DESCRIPTION OF THE ATTACHED DRAWINGS

A DETAILED DESCRIPTION OF THE PREFERRED EMBODIMENT

In the following description, it will be apparent to those skilled in the art that the present invention may be practiced in other embodiments that depart from these specific details. For the purpose of clarity, detailed descriptions of well-known parts are omitted so as not to obscure the description of the present invention with unnecessary detail.

Figure 1:
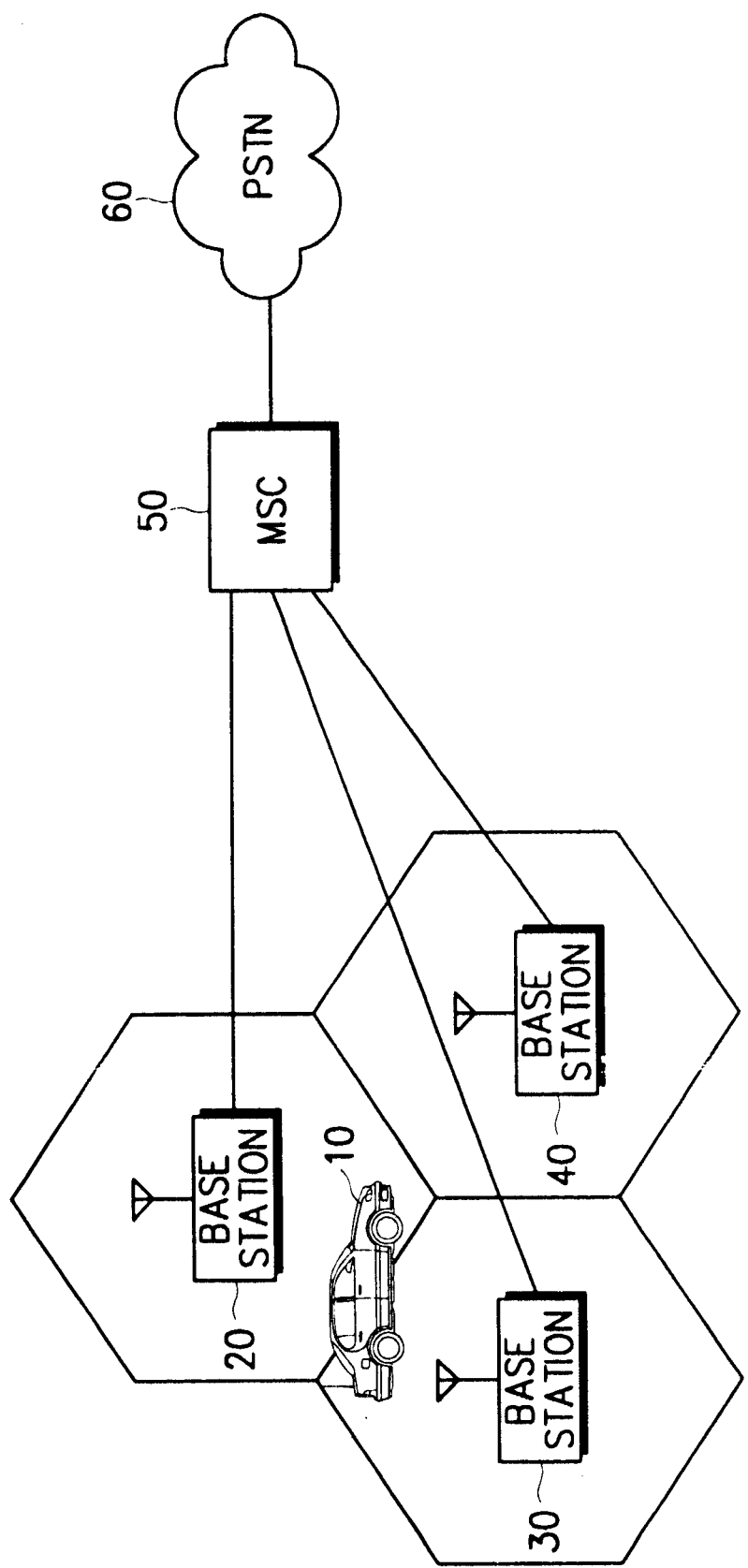
FIG. 1 is a block diagram for illustrating the structure of the conventional network of a CMTS using a CDMA technology.
Figure 2:
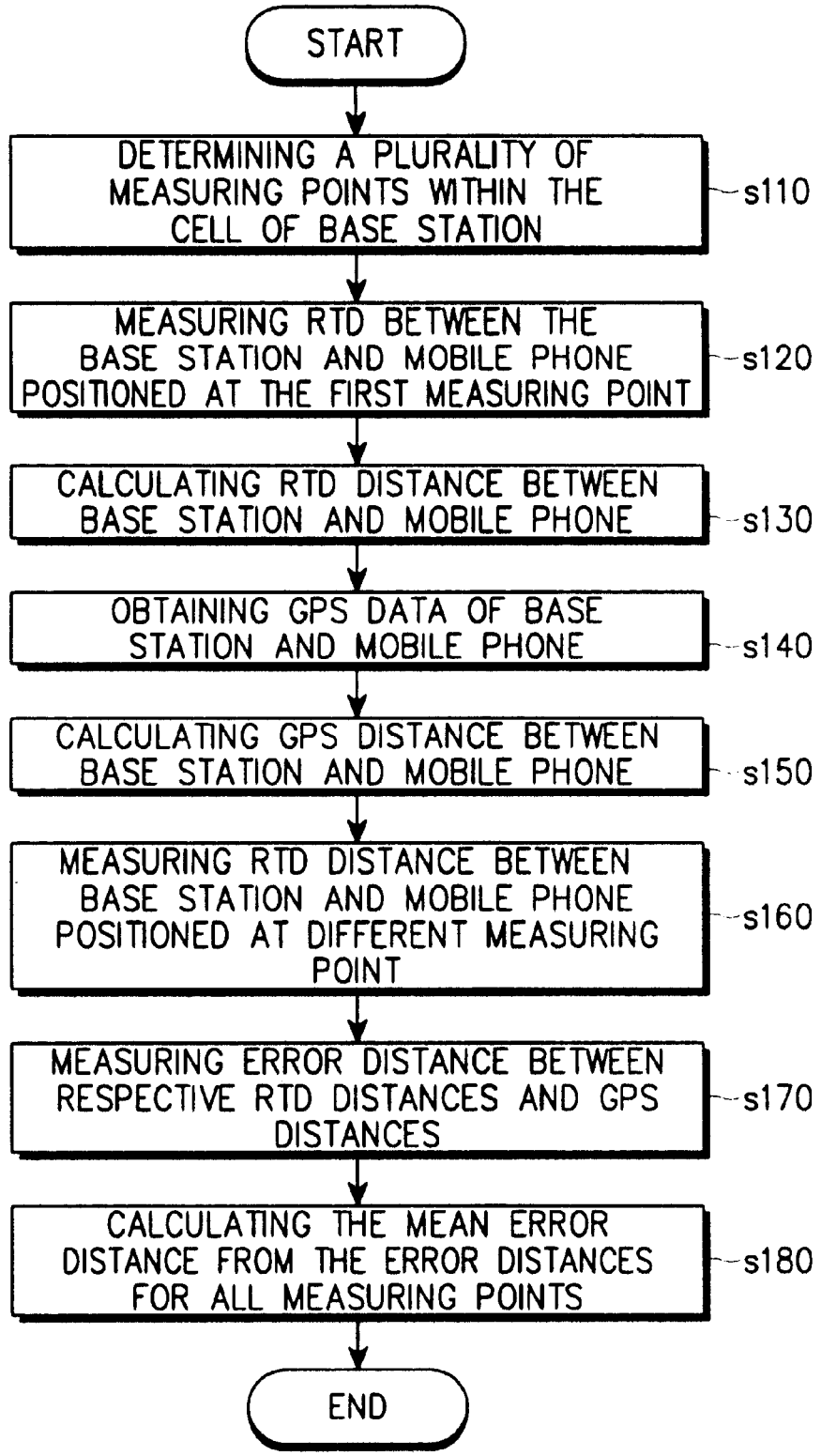
FIG. 2 is a flow chart for illustrating the steps of obtaining a mean error distance according to the present invention.

Referring to FIG. 2, in step S110, a plurality of measuring points or reference locations is determined within the cell of a base station 20 which are used for obtaining the error distance between the base station and a mobile phone. For example, the number of the measuring point is selected to be at one hundred different locations. In step S120, the mobile phone 10 is positioned at one of the measuring positions—namely, the first measuring position—to measure the RTD between the first measuring point and the base station. The RTD measurement is processed using a measuring device provided in the base station and the mobile phone. To this end, as shown in FIG. 1, the measuring tool of the mobile phone 10 makes the mobile phone to establish a call connection in the first position while that of the base station 20 traces the electronic serial number (ESN) of the mobile phone to measure the RTD. In this case, two or more mobile phones may be positioned at the first measuring position and their mean RTD can be obtained to avoid any measurement error.

The measured RTD is transmitted to a separate analysis tool, such as SCAT 97 and C_MAT, to calculate the one-way propagation distance between the base station and the mobile phone, namely the RTD distance, in step S130. In this case, the RTD is defined as the sum of the forward one-way propagation delay taken by a prescribed message to be transmitted from the base station 20 to the mobile phone 10, the reverse one-way propagation delay taken by the return message to be transmitted from the mobile phone to the receiving antenna of the base station, and the system delay taken for the base station to demodulate and analyze the return message received through the antenna of the base station. The system delay maybe obtained by positioning the mobile phone in front of the antenna of the base station and measuring the RTD thereto. Namely, the system delay is a delay caused by the system; thus, it can be defined by positioning the mobile phone just in front of the antenna of the base station. Accordingly, a true RTD may be obtained by dividing the remainder, after subtracting the system delay from the measured RTD by two because the measured RTD includes the forward and the reverse one-way propagation delays as well as the system delay. Thus, the one-way propagation delay may be expressed by the following Equation 1:

$$\text{One-way propagation delay} = \tag{Equation 1}$$
$$(P \times PSTYLE \times CTRLCODE \times DATA + /CTRLCOD) =$$
$$\frac{\text{forward\_one-way\_propagation\_delay} + \text{reverse\_one-way\_propagation\_delay}}{2},$$

wherein the one-way propagation delay is calculated using the chip unit that is about 0.8138 $\mu$s in the case of a mobile communication system having a transmission speed of 1.2288 Mcps. Hence, in such mobile communication system, the one-way propagation delay can be determined by the following Equation 2:

$$\text{One-way propagation distance} = 0.8138\mu s \times \text{light speed} \times \text{one-way propagation delay} \tag{Equation 2}$$
$$= 243.97 \times \text{one-way propagation delay}$$

wherein the speed of light is assumed to be $2.998 \times 10^8$ [m/sec].

Then, in step S140, using the satellite, the GPS data of the mobile phone 10 and the base station 20 is obtained, transferred to the analysis tool to calculate the GPS distance between the base station 20 and the mobile phone 10, in step S150. The GPS data is collected by linking a GPS receiver with a SDM, a terminal data collecting tool, at the corresponding testing position, and it consists of the latitude and the longitude distance information in relation to the base station. Hence, the GPS distance between the base station and the mobile phone may be expressed by the square root of the sum of their longitudinal difference squared and the latitudinal difference squared. However, the GPS has an inherent measurement error of about 200 m; thus, the maximum measurement error range can be about 400 m.

Accordingly, in step S160, the respective RTD distances and the GPS distances are obtained for the remaining measuring points by repeating the previous steps (s110 through s 150).

Meanwhile, the RTD distance between the base station and the mobile phone has an inherent error because of the possible microwave obstructions, such as buildings and other structures. Thus, the RTD tends to have greater error than the corresponding GPS distance. For this reason, the analysis tool calculates the error distance between the respective RTD distances and the GPS distances in step S170 to obtain the mean error distance for a particular base station by taking the difference between the respective RTD distances and the GPS distances. According to the present invention, such error distance is obtained for four base stations, each having a typical geographic morphology as shown in Table 1.

TABLE 1

| Geographic Morphology of Base Station | Dense Urban | Ordinary Urban | Surburban | Rural Area |
|---|---|---|---|---|
| Cell Type | 2 Sectors | 3 Sectors | 3 Sectors | 3 Sectors |
| Service Radius | 0.7~0.8Km | 0.8~1Km | 1.5~1.7Km | 2~2.5Km |

In Table 1, the service radius represents the straight distance between the base station and the mobile phone. The number of measuring points has been selected to be 100 for the cell boundary of each base station to measure the relationship between the error distance and the geographic morphology. Then, the RTDs and the GPS data of the base station and mobile phone for all measuring points were obtained to calculate the RTD distances and the GPS distances between the base station and the mobile station.

Figure 3:
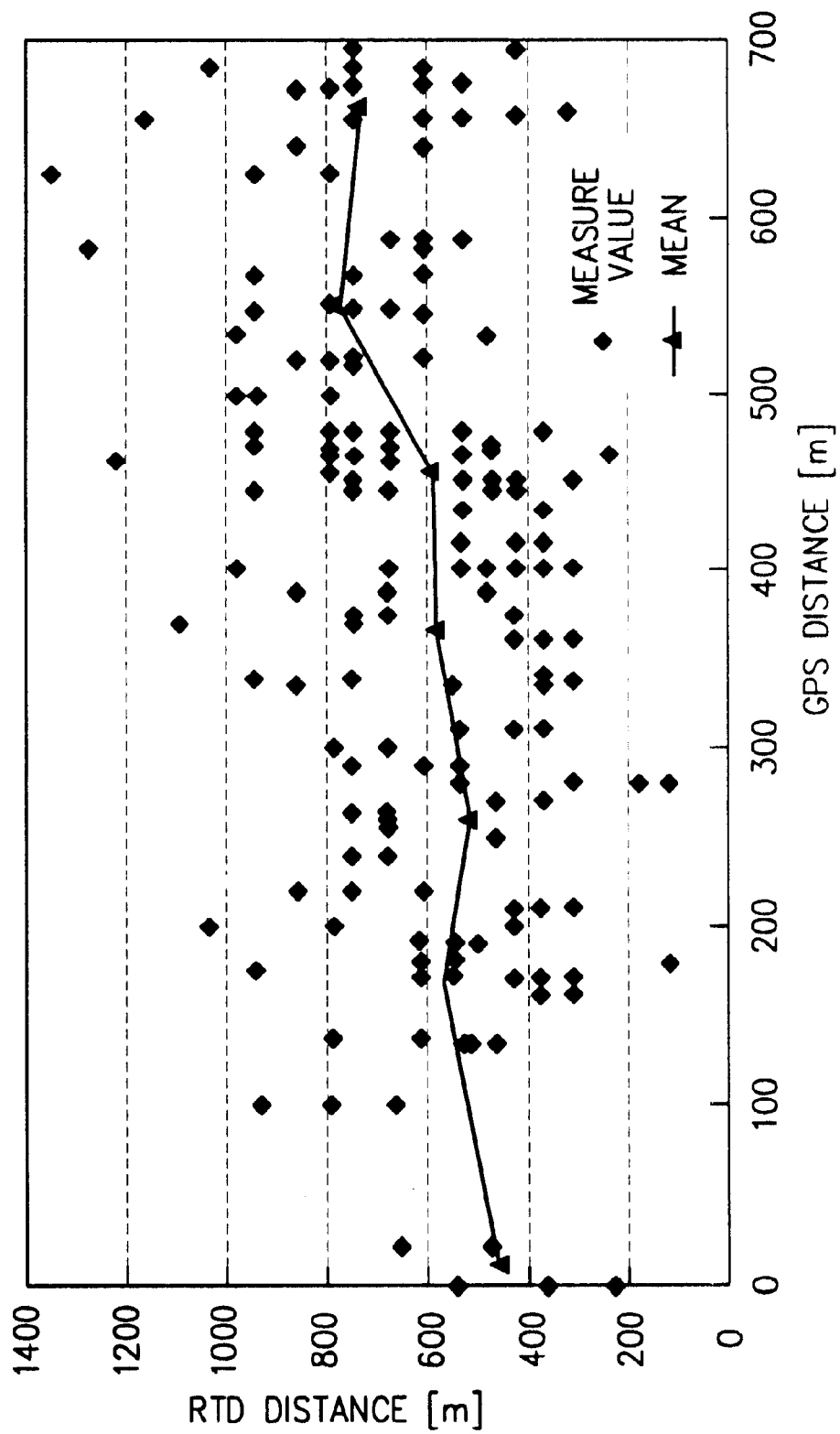
FIG. 3 is a graph for illustrating the distribution of RTD distances against the GPS distances in a densely populated urban area.
Figure 4:
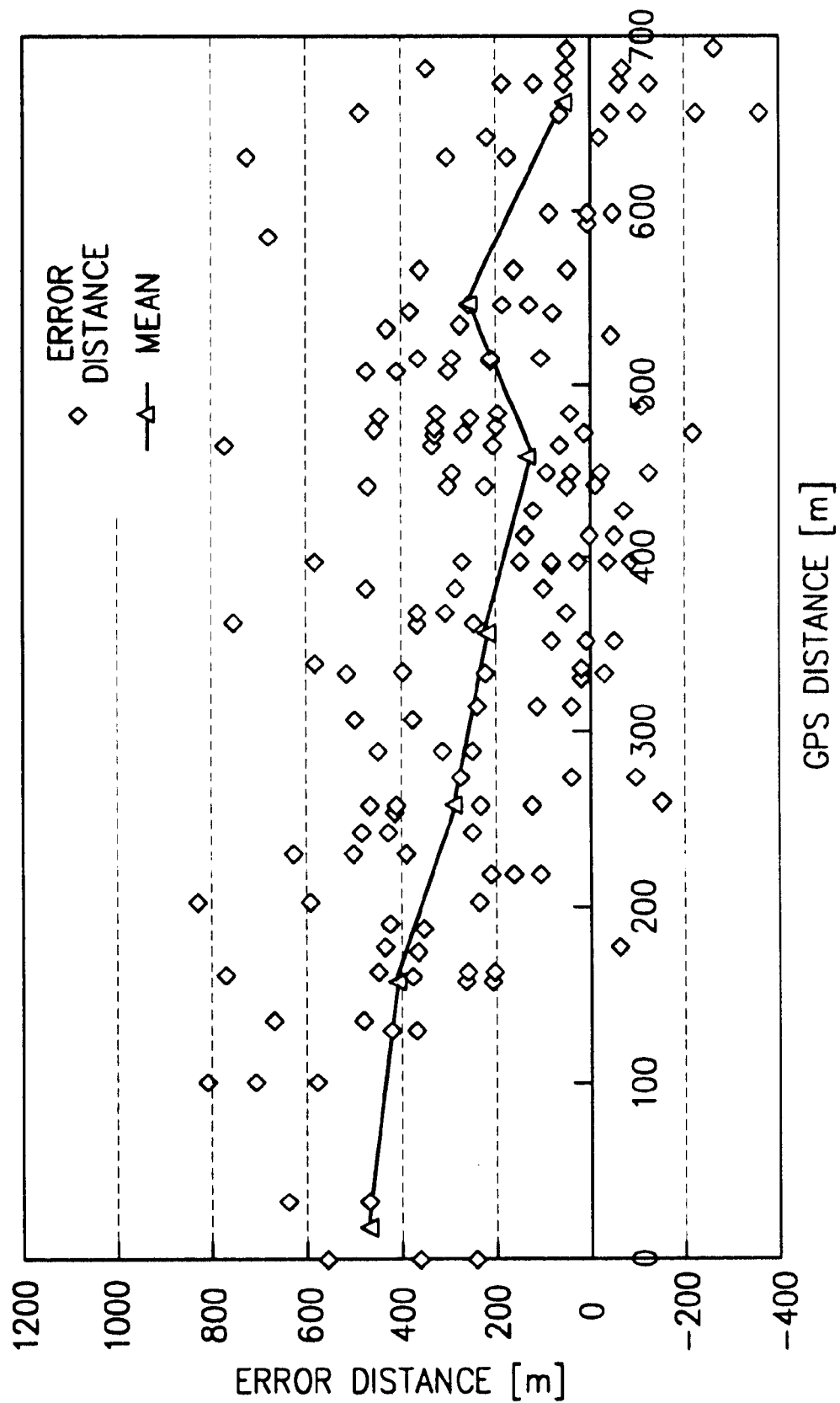
FIG. 4 is a graph for illustrating the distribution of error distances between the RTD distances and the GPS distances in a densely populated urban area.
Figure 5:
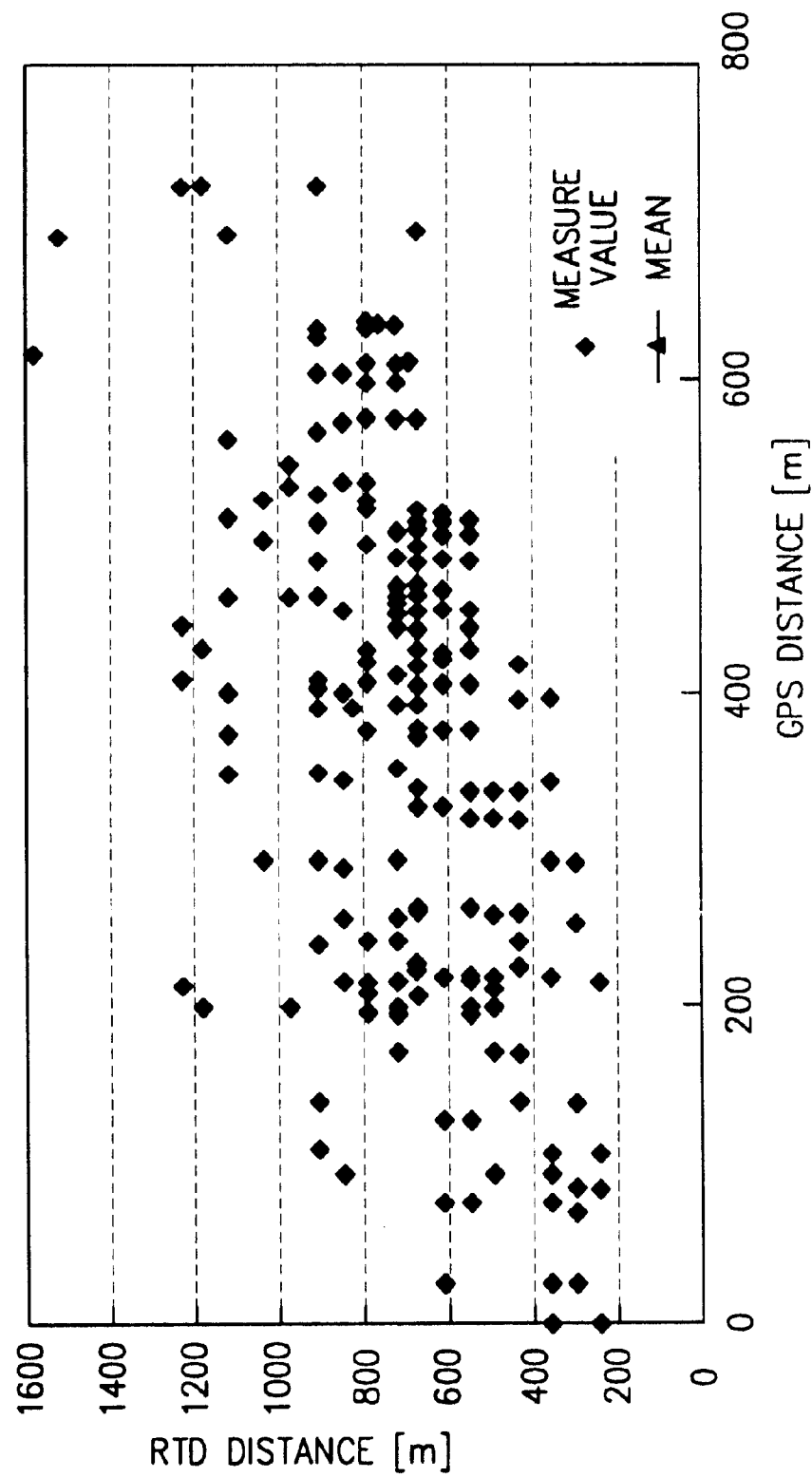
FIG. 5 is a graph for illustrating the distribution of RTD distances against the GPS distances in an ordinary urban area.
Figure 6:
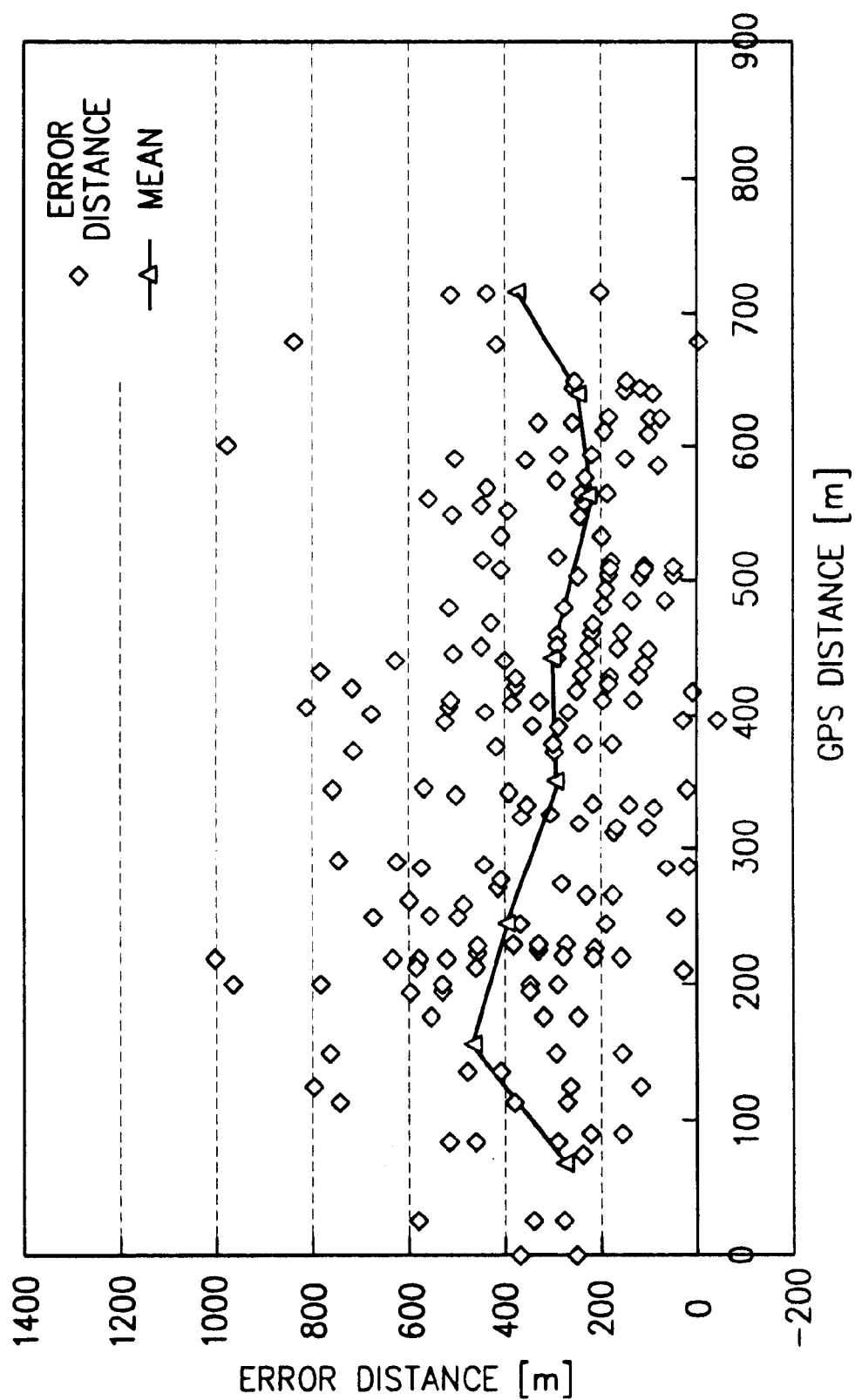
FIG. 6 is a graph for illustrating the distribution of error distances between the RTD distances and the GPS distances in a densely populated urban area.
Figure 7:
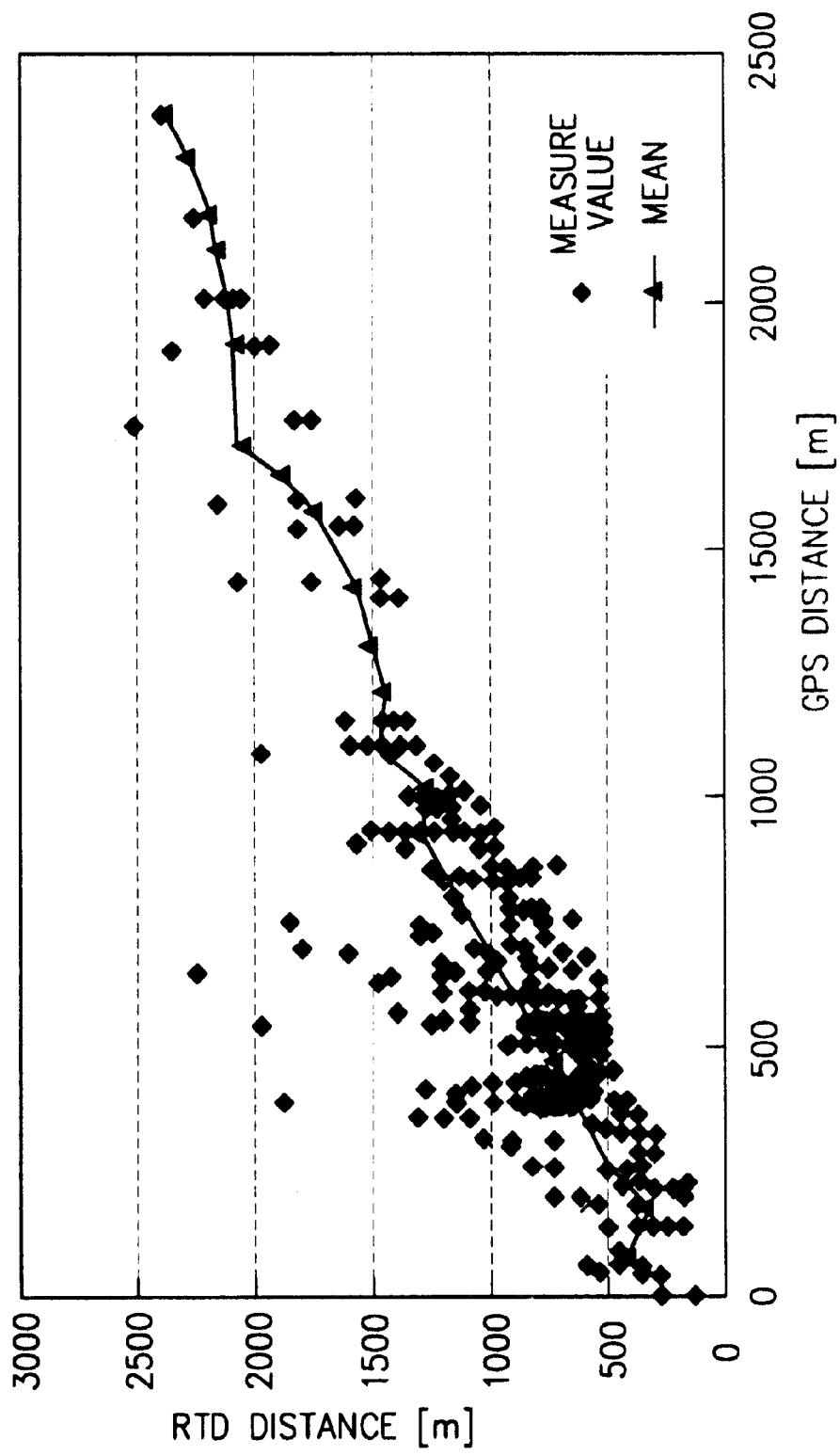
FIG. 7 is a graph for illustrating the distribution of RTD distances against the GPS distances in a suburban area.
Figure 8:
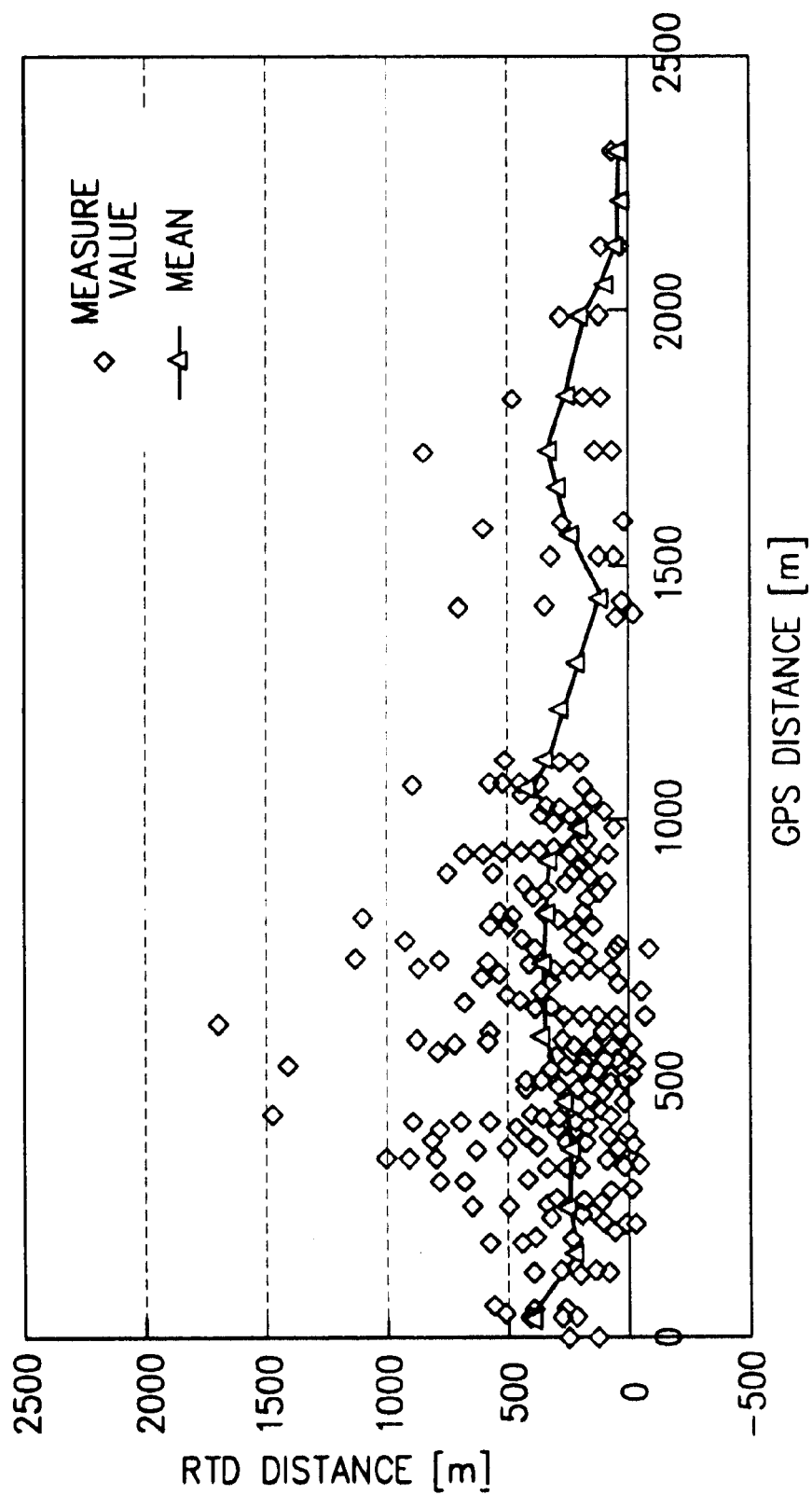
FIG. 8 is a graph for illustrating the distribution of error distances between the RTD distances and the GPS distances in a suburban area.
Figure 9:
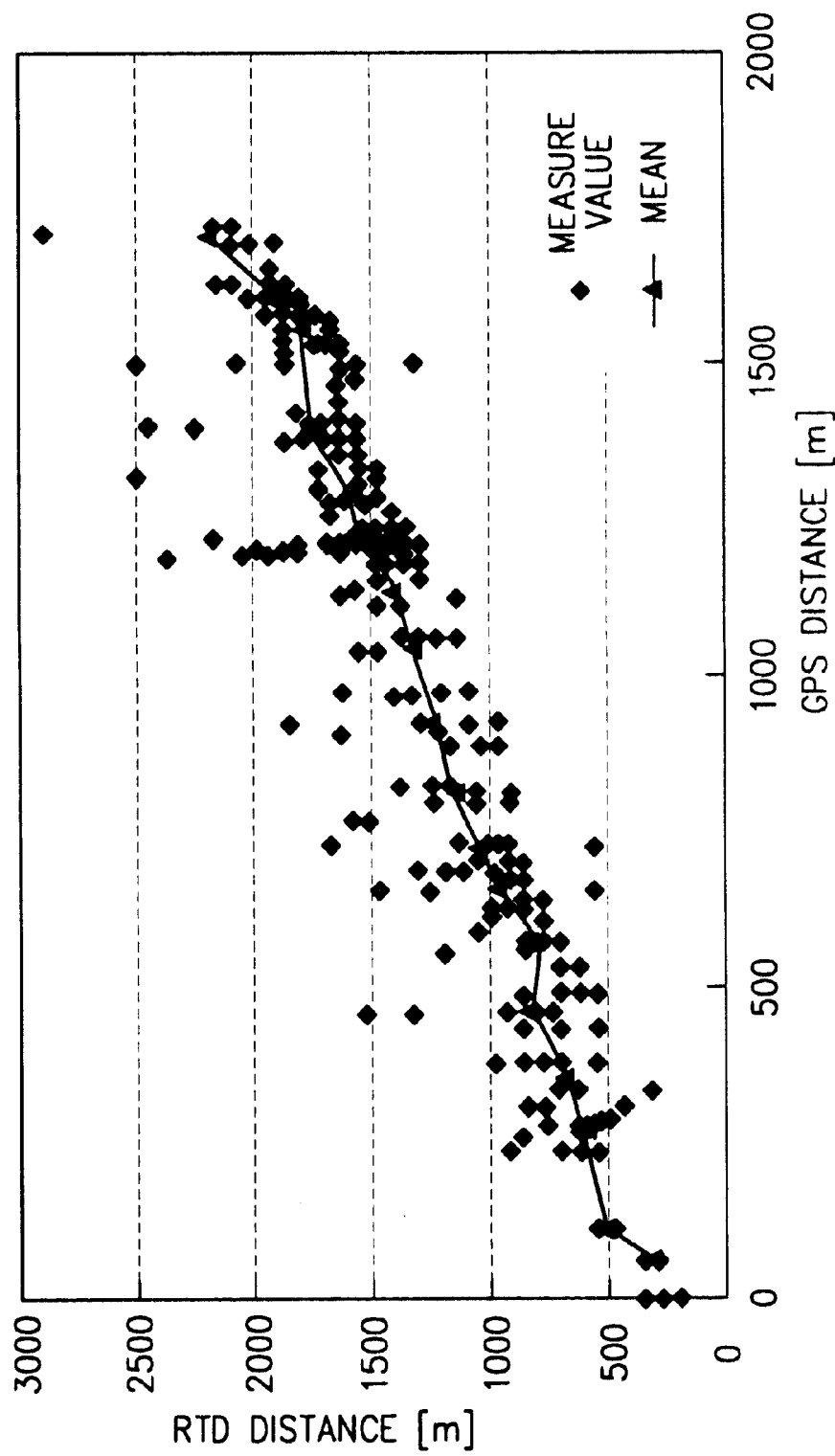
FIG. 9 is a graph for illustrating the distribution of RTD distances against the GPS distances in a rural area.
Figure 10:
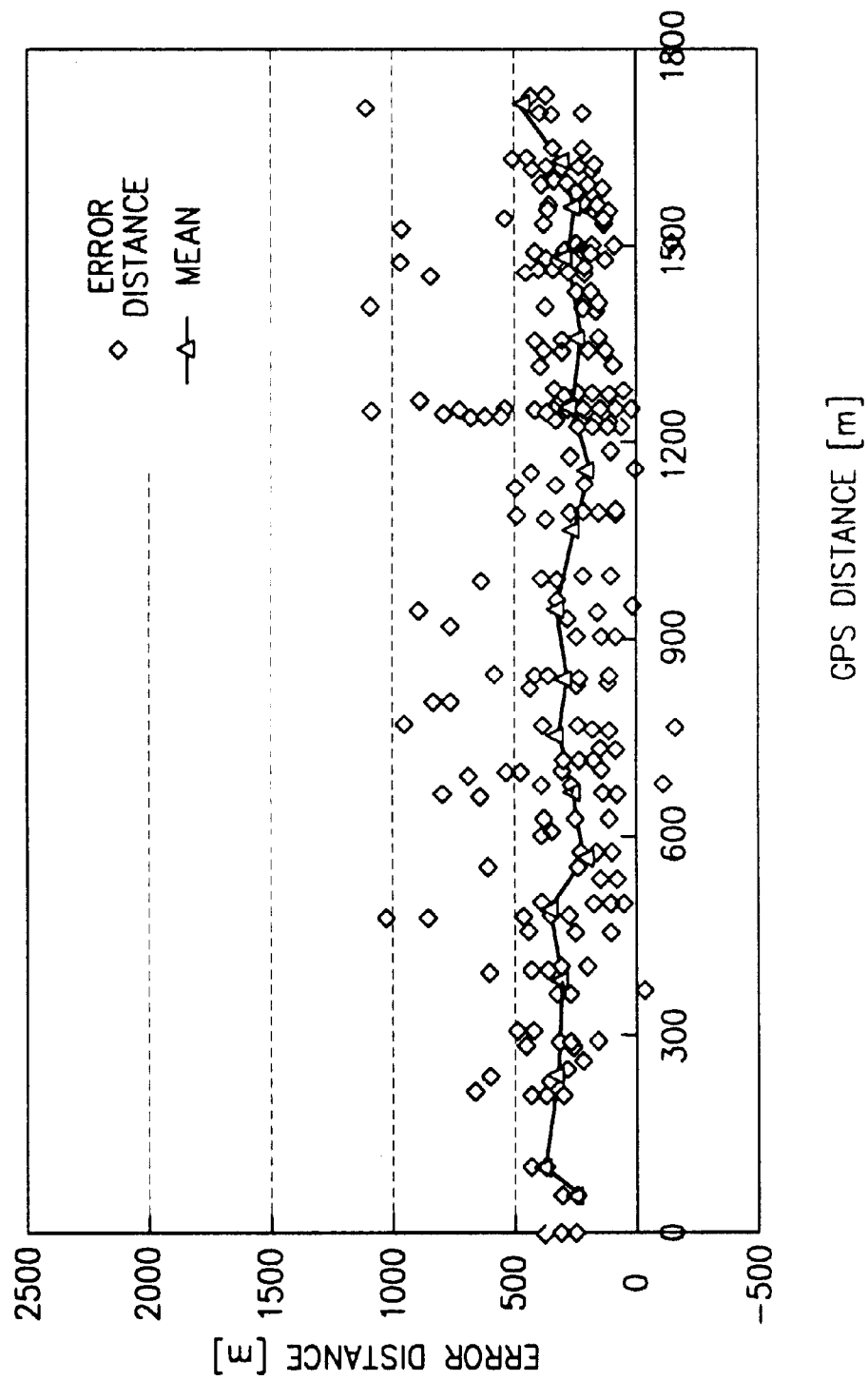
FIG. 10 is a graph for illustrating the distribution of error distances between the RTD distances and the GPS distances in a rural area.

FIG. 3 illustrates the distribution of the RTD distances against the GPS distances and FIG. 4 illustrates the distribution of error distances between the RTD distances and the GPS distances in a dense urban area. Likewise, FIG. 5 and FIG. 6 show a similar relationship between the RTD distances and the GPS distances in an urban area, respectively; FIG. 7 and FIG. 8 exhibit the same in a suburban area; and, FIG. 9 and FIG. 10 exhibit the same relationship in a rural area.

Figure 11:
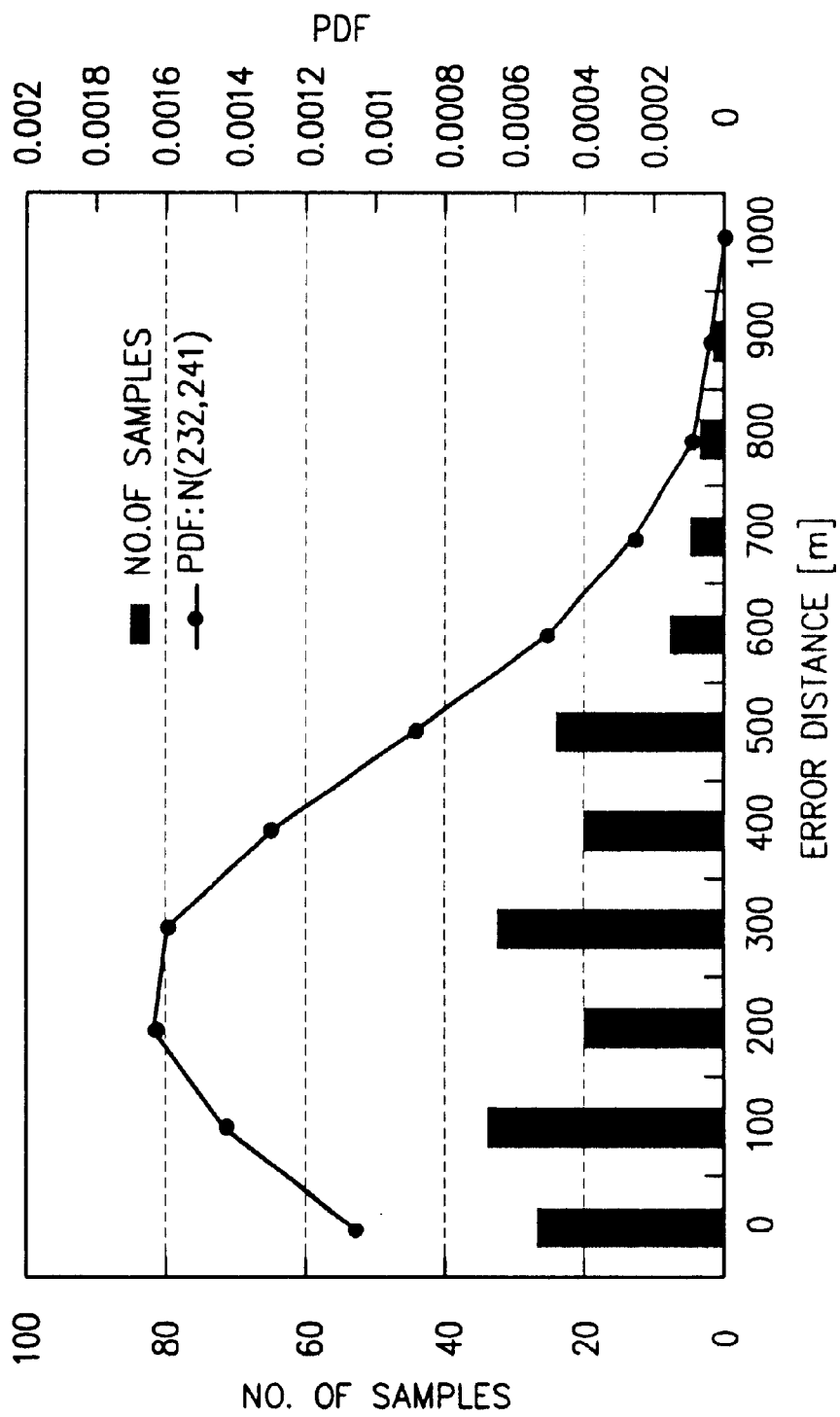
FIG. 11 is a graph for illustrating the number of error distances against the GPS distances and the probability density function thereof in a densely populated urban area.
Figure 12:
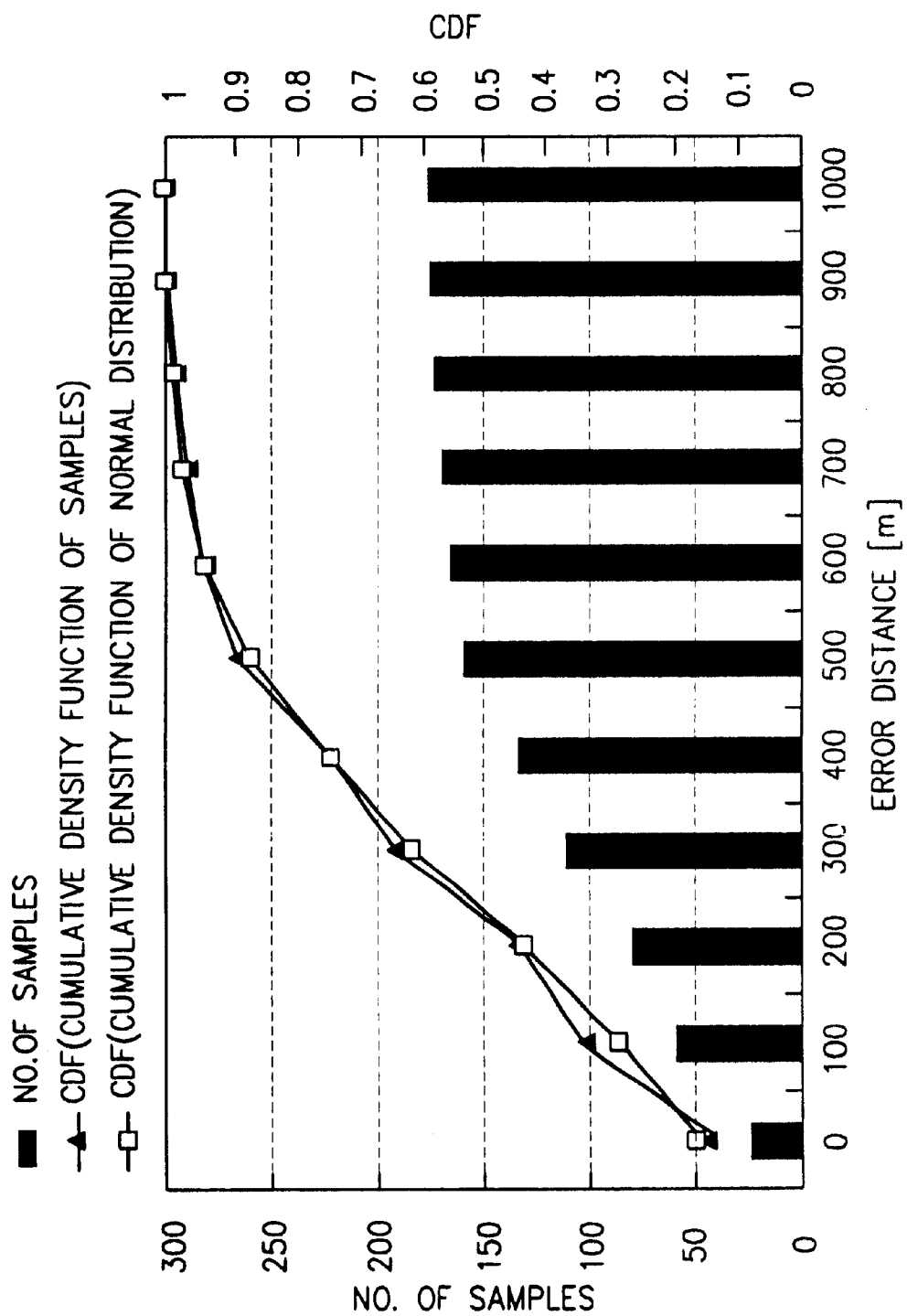
FIG. 12 is a graph for illustrating the number of error distances cumulated against the GPS distances, and the cumulative density function and the normal cumulative density function thereof in a densely populated urban area.

In order to statistically analyze the error distance of each base station based on the results as shown in FIGS. 3 to 10, the error distance of each measuring point was regarded as a sample, and the number of the error distances per 100 m is used to obtain the number of samples. FIG. 11 illustrates the number of samples and their probability density function (pdf) against the GPS distances in the dense urban area, representing the mean error distance as 232 m and the standard deviation as 241 m. In addition, FIG. 12 illustrates number of error distances cumulated against the GPS distances, the cumulative density function (cdf) of the samples, and the normal cumulative density function of the normal distribution of the error distances in a dense urban area.

Figure 13:
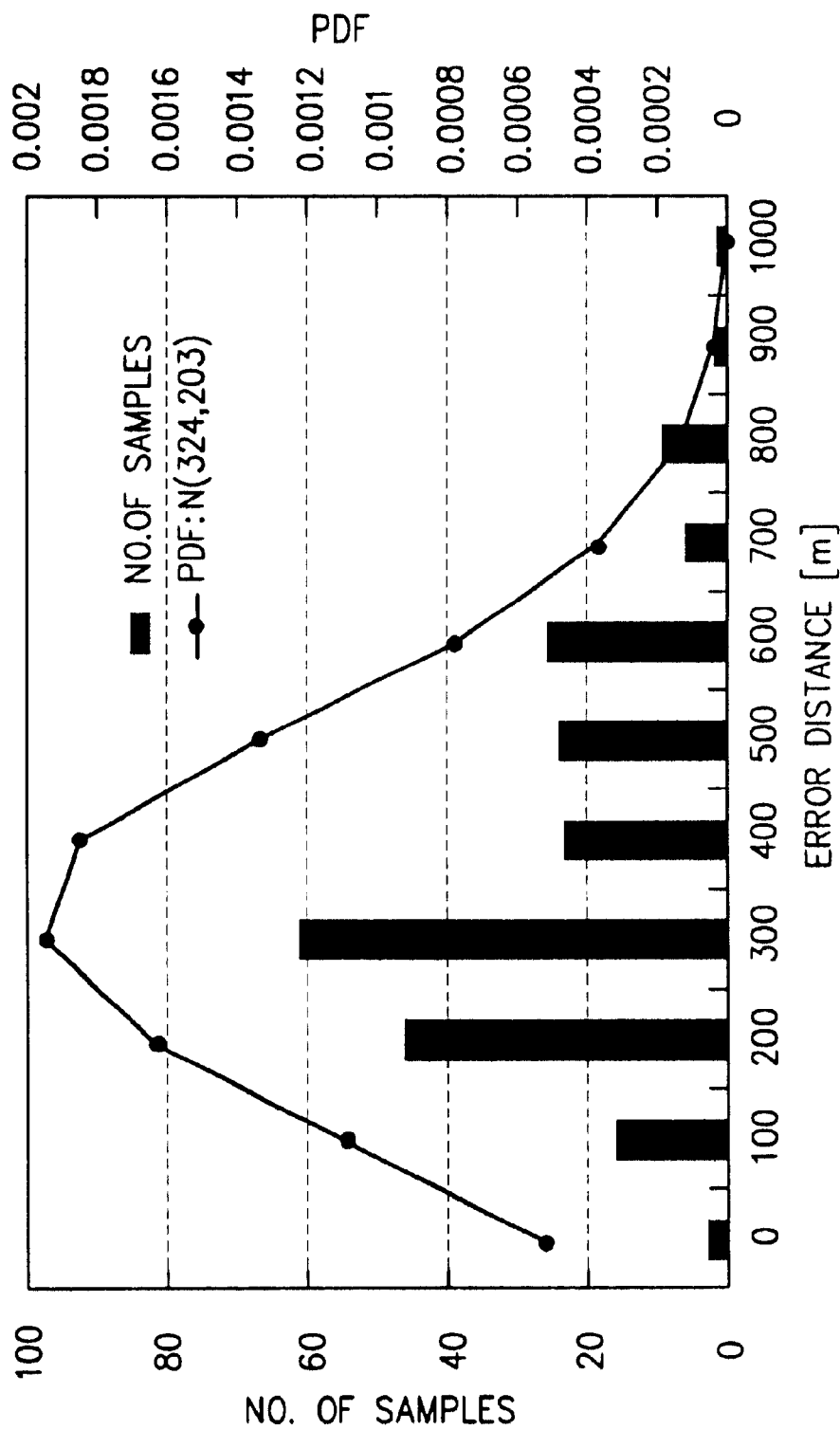
FIG. 13 is a graph for illustrating the number of error distances against the GPS distances and the probability density function thereof in an ordinary urban area.
Figure 14:
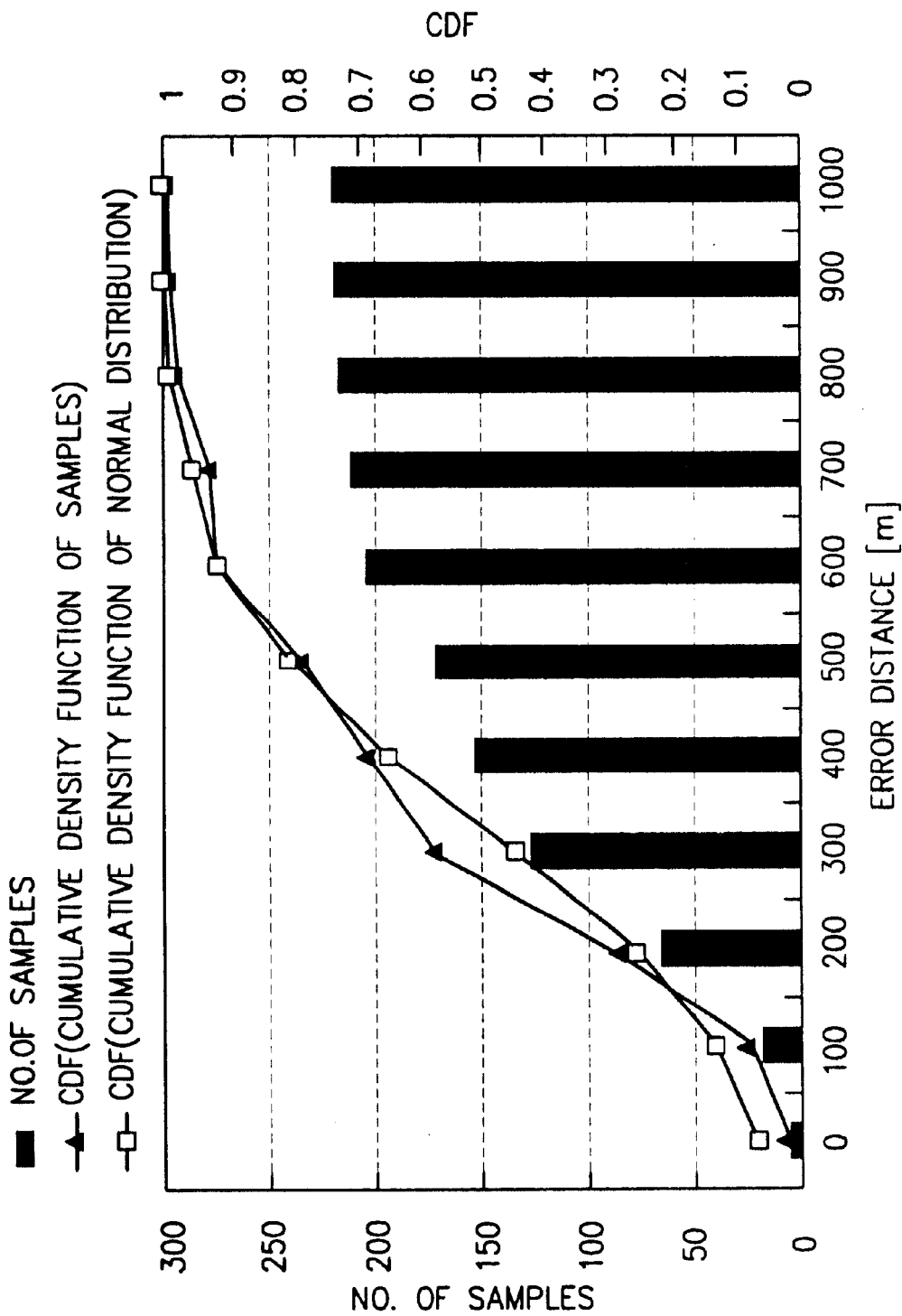
FIG. 14 is a graph for illustrating the number of error distances cumulated against the GPS distances, and the cumulative density function and the normal cumulative density function thereof in an ordinary urban area.
Figure 15:
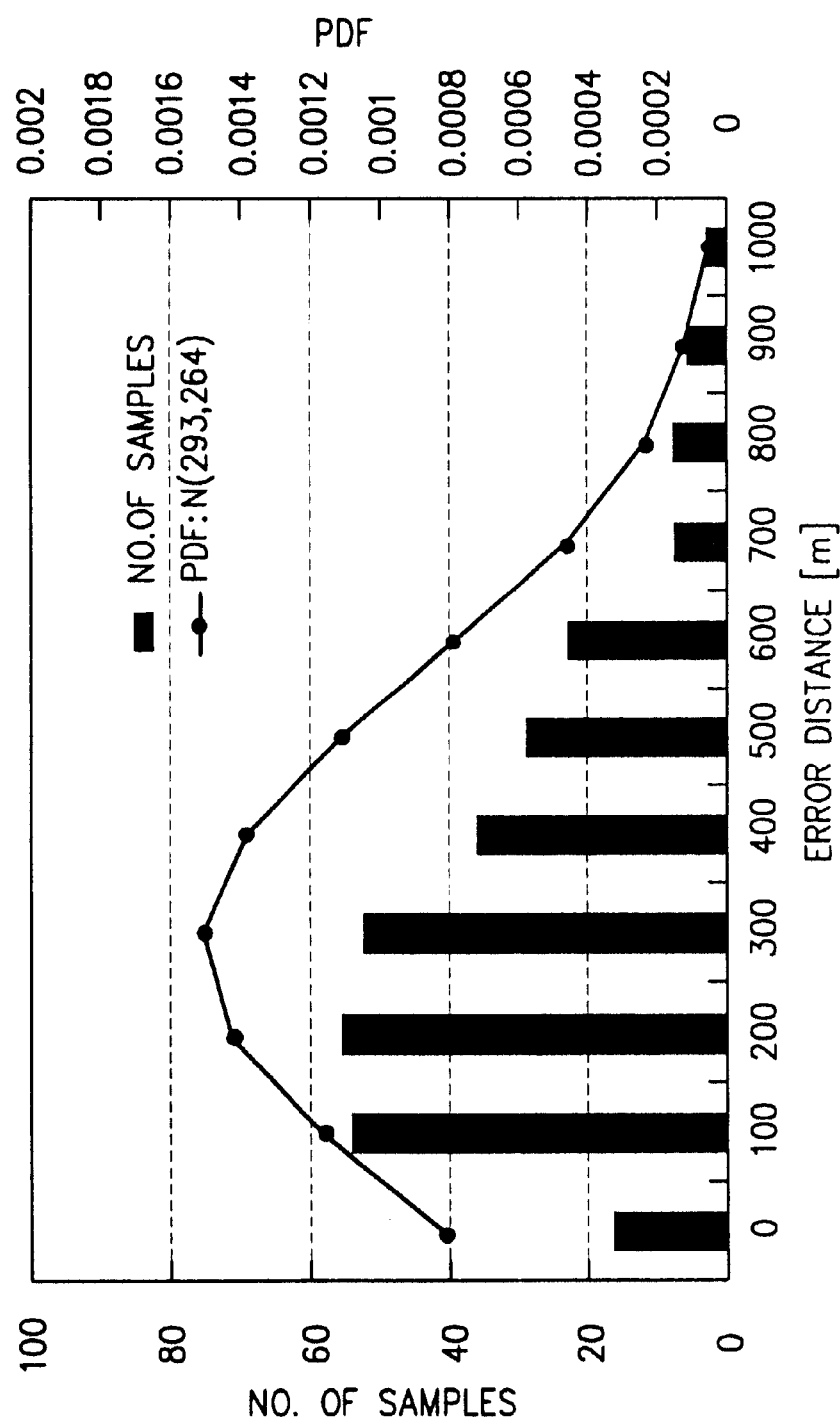
FIG. 15 is a graph for illustrating the number of error distances against the GPS distances and the probability density function thereof in a suburban area.
Figure 16:
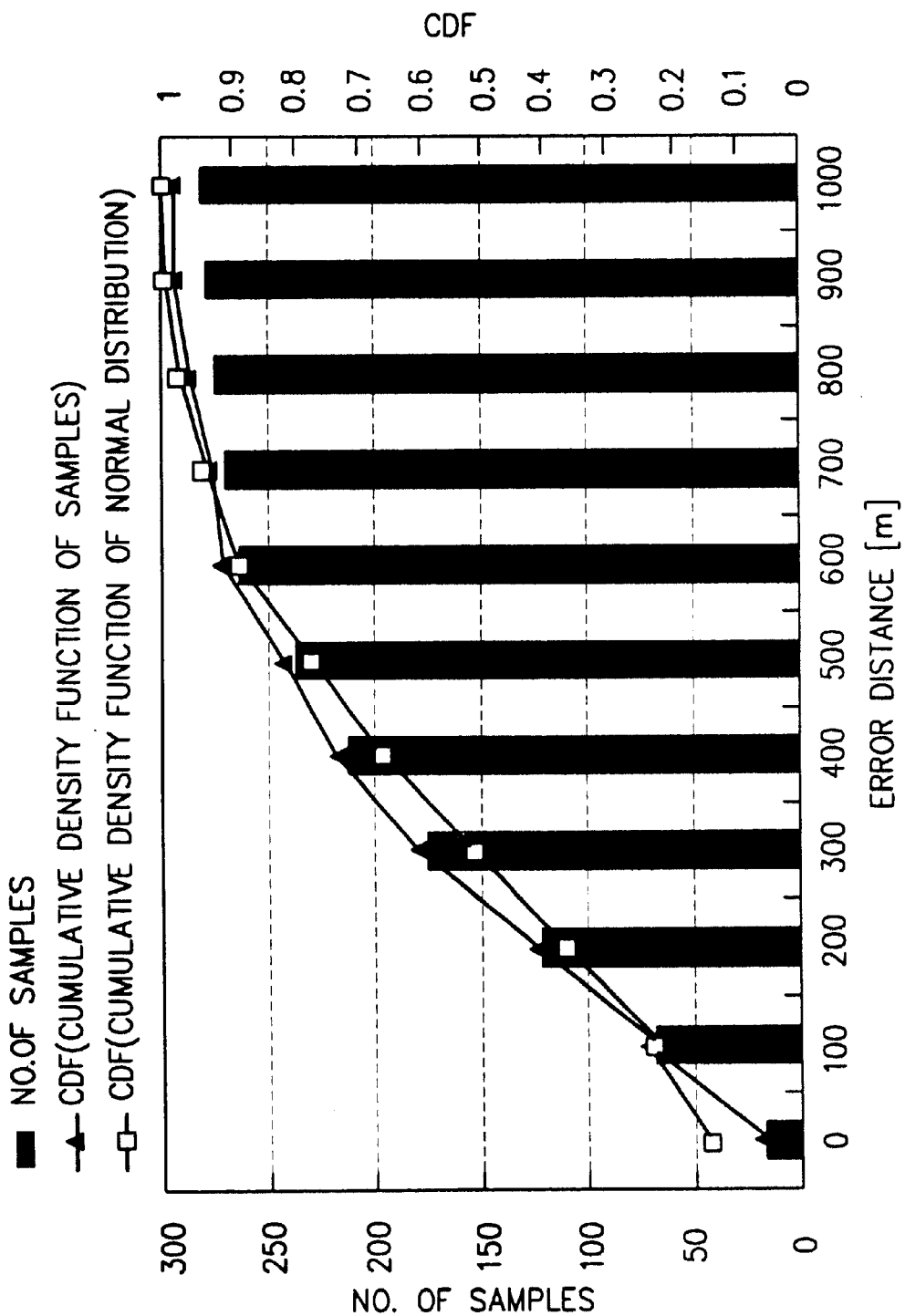
FIG. 16 is a graph for illustrating the number of error distances cumulated against the GPS distances, and the cumulative density function and normal cumulative density function thereof in a suburban area.
Figure 17:
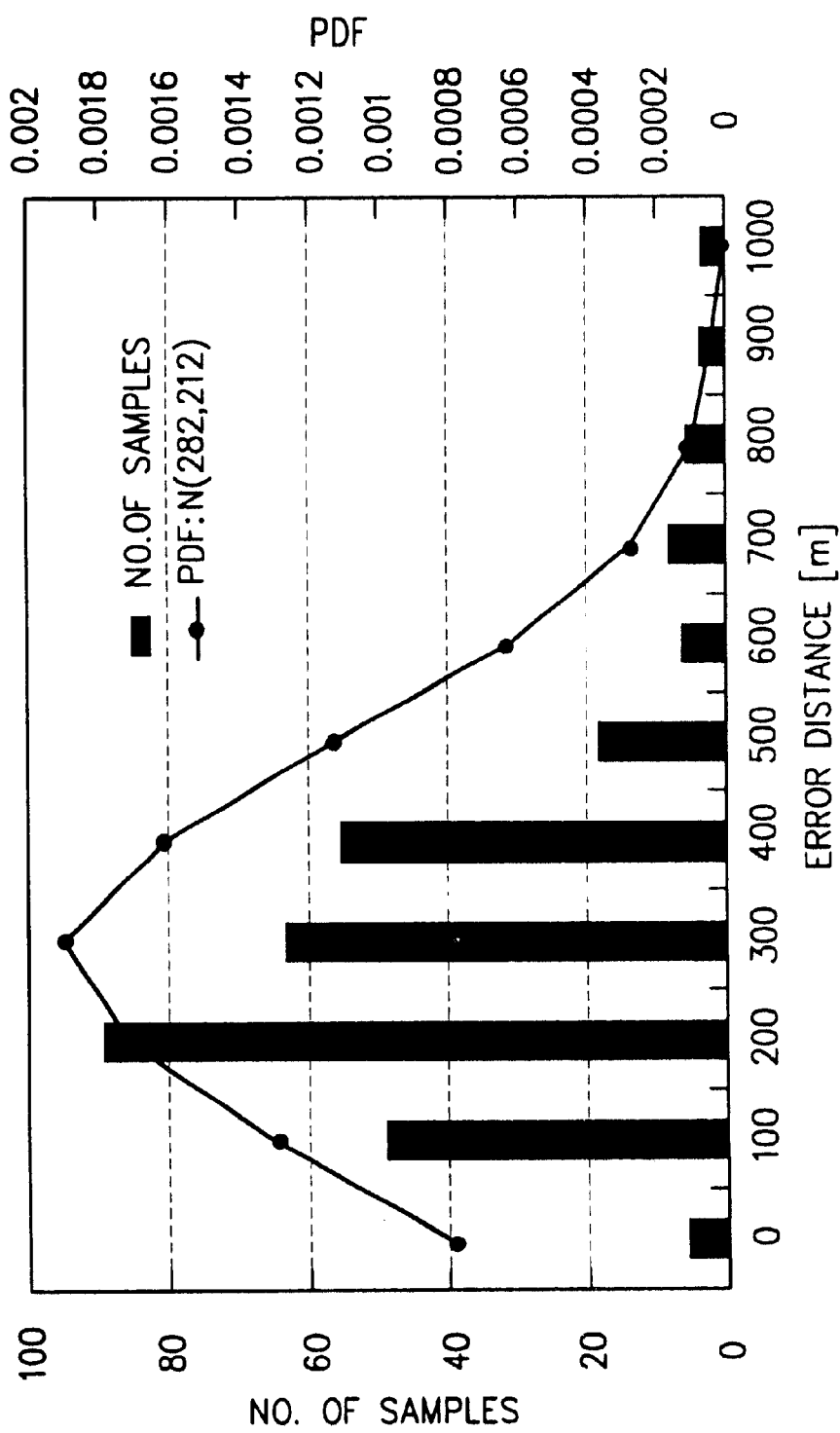
FIG. 17 is a graph for illustrating the number of error distances against the GPS distances and the probability density function thereof in a rural area.
Figure 18:
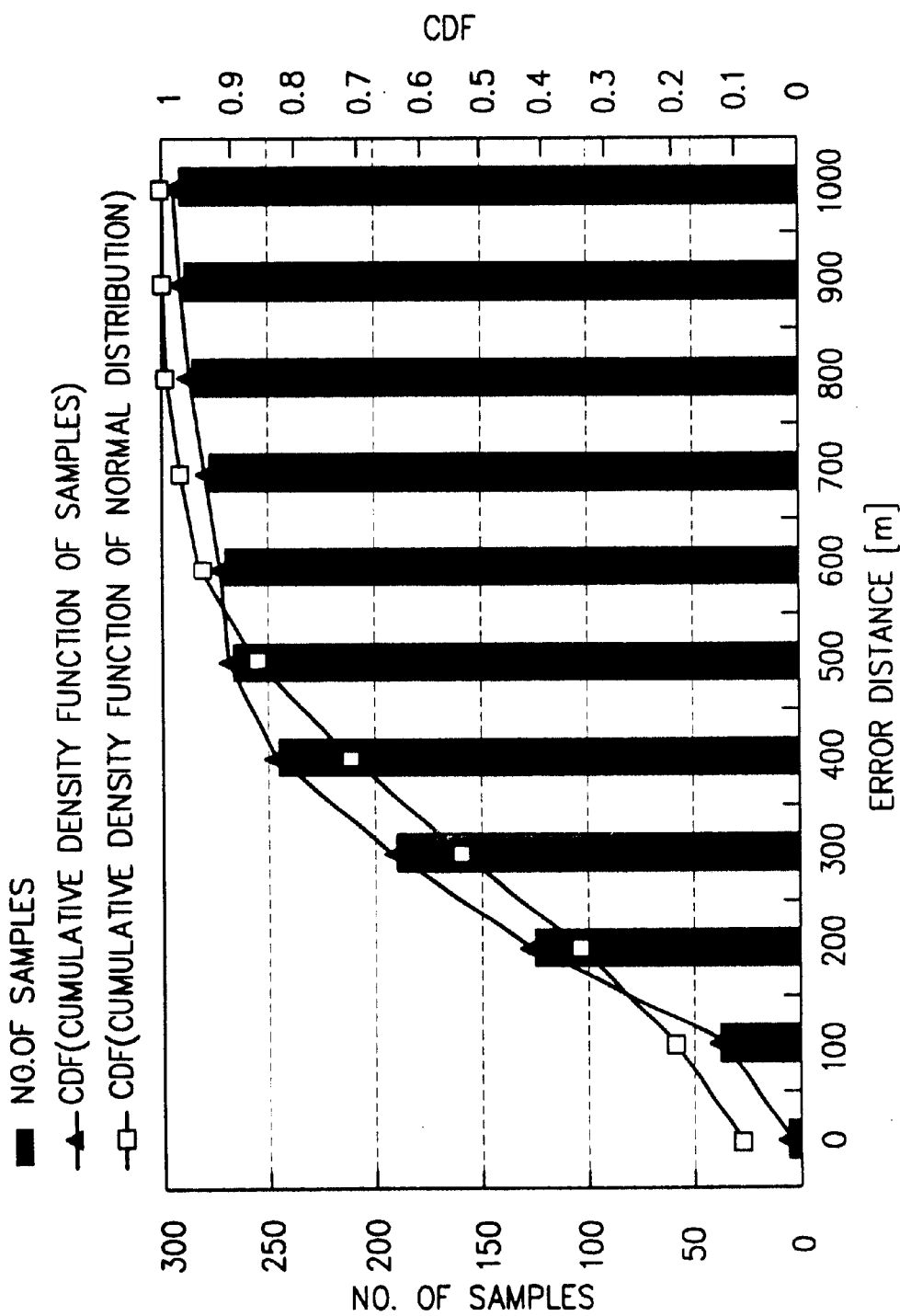
FIG. 18 is a graph for illustrating the number of error distances cumulated against the GPS distances, and the cumulative density function and normal cumulative density function thereof in a rural area; and, FIG. 19 is a flow chart for illustrating a method of measuring the distance between a mobile phone and a base station according to the present invention.

Likewise, FIGS. 13 and 14 illustrate similar views in the urban area, representing the mean error distance as 324 m and the standard deviation as 203 m; FIGS. 15 and 16 represente the mean error distance as 293 m and the standard deviation 264 m in the suburban area; and, FIGS. 17 and 18 represents the mean error distance as 282 m and the standard deviation as 212 m in the rural area.

As shown in FIGS. 3 to 18, the functionality of the distribution of the RTD distances to the GPS distances is enhanced in the order of dense urban<urban<suburban<rural area, and the mean error distance in the dense urban becomes smaller as the GPS distance increases. It is also noted that the error distances for each geographic morphology is relatively distributed around 200 m~300 m. If 90% error is allowed for the RTD distance for dense urban, urban, suburban, and rural areas, respectively, the error distance of 550, 580, 640 and 550 m or below are exhibited. Further, if allowing 99% error, they all have the error distance below 1 Km. Thus, such mean error distance can be applied to calculate the distance between the base station and the mobile phone as explained hereinbelow.

Figure 19:
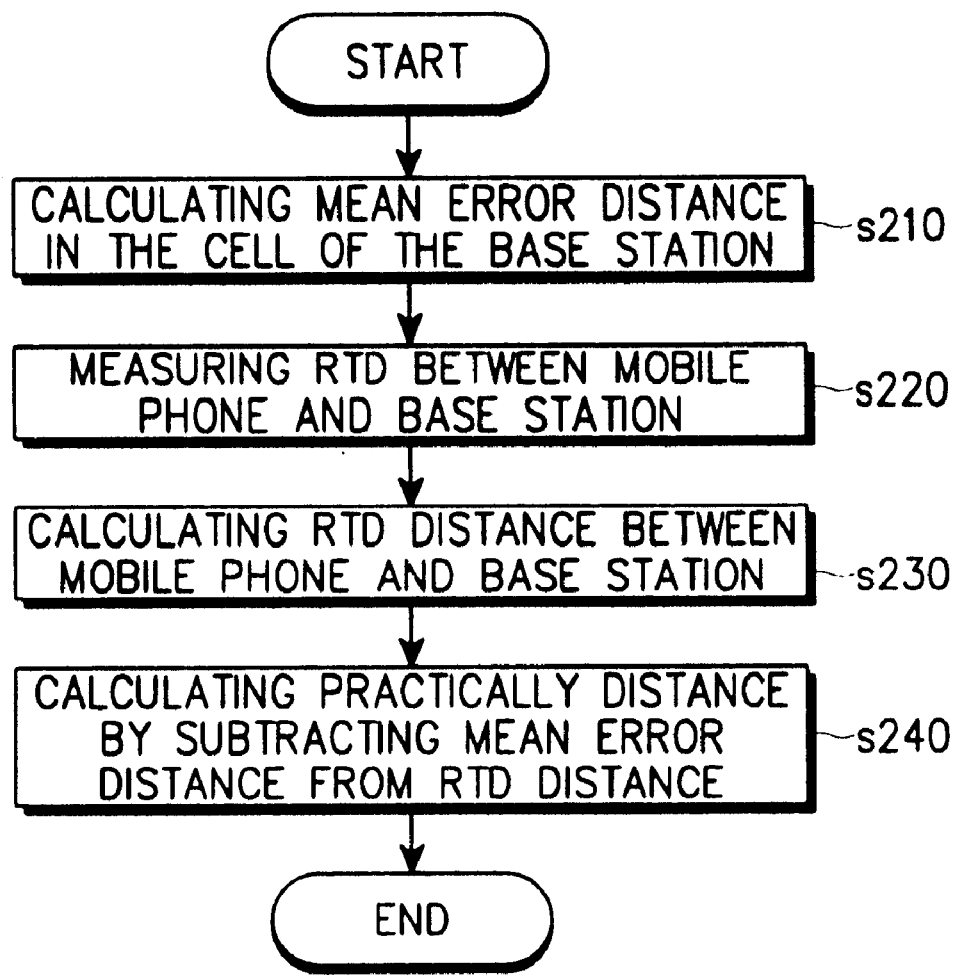

Describing the method of calculating the distance between the base station and the mobile phone in connection with FIG. 19, the RTD distance and the GPS distance are obtained for the cell boundary of a base station to calculate the mean error distance in step S210. Then, the RTD is measured between the base station and the mobile phone positioned at an arbitrary point in its cell, in step S220. Then, the RTD distance is calculated from the RTD measurement in step S230. Finally, the new distance according to the present invention between the mobile phone and the base station is obtained by subtracting the mean error distance from the RTD distance, in step S240. Of course, the mean error distance calculated for a particular base station may be applied to a mobile phone positioned at any point in the cell of the base station.

As mentioned in the foregoing, the present invention provides the CMTS with the means for predetermining the mean error distance based on the RTD and the GPS data in order to obtain the practically more accurate distance between the mobile phone and the base station which is more relatively close to the true distance between them.

While the present invention has been described in connection with specific embodiments accompanied by the attached drawings, it will be readily apparent to those skilled in the art that various changes and modifications may be made thereto without

What is claimed is:

1. A method for measuring a mean error distance to adjust the distance between a mobile phone and a base station in a cell obtained by a round-trip delay (RTD) of a prescribed message transmitted from said base station to said mobile phone in a cellular mobile telephone system (CMTS), said method comprising the steps of:

determining a plurality of measuring points within the cell of said base station to be used for obtaining said mean error distance;

measuring respective RTDs between said measuring points and said base station by sequentially positioning said mobile phone at each of said measuring points;

calculating respective RTD distances between said measuring points and said base station based on said RTD measurements;

obtaining respective Global Positioning System(GPS) data for said measuring points and said base station;

calculating respective GPS distances between said measuring points and said base station based on said GPS data;

calculating respective error distances by taking the difference between said respective RTD distances and said GPS distances; and, obtaining said mean error distance from said respective error distances.

2. The method as defined in claim 1, wherein said step of measuring the respective RTDs between said measuring points and said base station further includes the steps of providing said mobile phone to establish a call connection with said base station and providing said base station to trace an electronic serial number of said mobile phone.

3. The method as defined in claim 1, wherein each of said respective RTDs is represented by a sum of a forward propagation delay by said prescribed message when transmitted from said base station to said mobile phone, a reverse propagation delay by said message returning from said mobile phone to said base station, and a system delay for said base station to demodulate and analyze said returned message.

4. The method as defined in claim 3, wherein said step of calculating said respective RTD distances between said measuring points and said base station further includes the steps of calculating one-way propagation delay from said measured RTD and calculating one-way wave distance from said measured RTD.

5. The method as defined in claim 4, wherein said one-way propagation delay is obtained by subtracting said system delay from said respective RTD and dividing the remainder by two.

6. The method as defined in claim 4, wherein said one-way wave distance is obtained by multiplying said one way propagation delay by the speed of light and the transmission speed of chip unit for said CMTS.

7. A method for measuring the distance between a mobile phone and a base station based on the round-trip delay (RTD) of a prescribed message transmitted from said base station to said mobile phone in a cellular mobile telephone system (CMTS), said method comprising the steps of:

calculating a mean error distance to adjust said distance between said base station and said mobile phone within the cell boundary of said base station;

measuring the RTD between said base station and said mobile phone positioned at an arbitrary point within the boundary of said cell;

calculating the RTD distance between said base station and said mobile phone based on said measured RTD; and, subtracting said mean error distance from said calculated RTD distance.

8. The method as defined in claim 7, wherein the step of calculating said mean error distance further includes the steps of:

determining a plurality of measuring points within the cell of said base station to be used for obtaining said mean error distance;

measuring respective RTDs between said measuring points and said base station by sequentially positioning said mobile phone at each of said measuring points;

calculating respective RTD distances between said measuring points and said base station based on said RTD measurements;

obtaining respective Global Positioning System(GPS) data for said measuring points and said base station;

calculating respective GPS distances between said measuring points and said base station based on said GPS data;

calculating respective error distances by taking the difference between said respective RTD distances and said GPS distances; and, obtaining said mean error distance from said respective error distances.

9. The method as defined in claim 8, wherein said step of measuring the respective RTDs between said measuring points and said base station further includes the steps of providing said mobile phone to establish a call connection with said base station and providing said base station to trace an electronic serial number of said mobile phone.

10. The method as defined in claim 8, wherein each of said respective RTDs is represented by a sum of a forward propagation delay by said prescribed message when transmitted from said base station to said mobile phone, a reverse propagation delay by said message returning from said mobile phone to said base station, and a system taken for said base station to demodulate and analyze said returned message.

11. The method as defined in claim 10, wherein said step of calculating said respective RTD distances between said measuring points and said base station further includes the steps of calculating one-way propagation delay from said measured RTD and calculating one-way wave distance from said measured RTD.

12. The method as defined in claim 11, wherein said one-way propagation delay is obtained by subtracting said system delay from said respective RTD and dividing the remainder by two.

13. The method as defined in claim 11, wherein said one-way wave distance is obtained by multiplying said one way propagation delay by the speed of light and the transmission speed of chip unit for said CMTS.

* * * * *